US008134323B2

(12) United States Patent
Leung et al.

(10) Patent No.: US 8,134,323 B2
(45) Date of Patent: Mar. 13, 2012

(54) BYPASS AND SYNCHRONOUS TRANSFER ARRANGEMENT FOR A MEDIUM VOLTAGE DRIVE CONTROL SYSTEM

(75) Inventors: Alex Leung, Fort Bend, TX (US);
Enrique Martinez, Harris, TX (US);
John Kleinecke, Houston, TX (US)

(73) Assignee: Toshiba International Corporation, Houston, TX (US)

( * ) Notice: Subject to any disclaimer, the term of this patent is extended or adjusted under 35 U.S.C. 154(b) by 409 days.

(21) Appl. No.: 12/388,272

(22) Filed: Feb. 18, 2009

(65) Prior Publication Data

US 2010/0207565 A1 Aug. 19, 2010

(51) Int. Cl.
*H02P 1/30* (2006.01)
*H02P 23/00* (2006.01)
*H02B 1/56* (2006.01)
(52) U.S. Cl. ......... 318/503; 318/807; 361/104; 361/676
(58) Field of Classification Search .................. 318/807, 318/778, 362, 445, 723, 503; 361/104, 676
See application file for complete search history.

(56) References Cited

U.S. PATENT DOCUMENTS

| 5,627,716 | A | * | 5/1997 | Lagree et al. | 361/93.2 |
| 6,055,145 | A | * | 4/2000 | Lagree et al. | 361/93.1 |
| 6,208,111 | B1 | * | 3/2001 | Williams | 318/778 |
| 7,081,735 | B1 | * | 7/2006 | Malkowski et al. | 318/807 |

OTHER PUBLICATIONS

Vitzro Tech (www.vizrotech.com) Low and Medium Voltage Equipments, pp. 1-28, Jun. 2005.*
Cutler Hammer (www.EatonElectrical.com) Motor Starter (Ampgard)—Medium Voltage, pp. 1-44, May 2004.*
Cutler-Hammer Chiller Starter (AMPGARD)—Medium Voltage Technical Data TD02003003E, pp. 1-28, 2006.*
Toshiba (www.ctiautomation.net) Power Distribution, JK Series—Reliability in motion pp. 1-7, No Date.*
Listen Think Solve Rockwell Automation OEM Products: Medium Voltage Application pp. 1-52, Mar. 2007.*
Schneider Electric Motorpact Medium Voltage Motor Controllers pp. 1-48, Apr. 2006.*
York Medium Voltage Variable Speed Drive pp. 1-48, 2007.*
RAM Industries (ramusa.com) Medium Voltage Starters—Across-the-line pp. 1-3, Nov. 2008.*
Schneider Electric Motorpact Medium Voltage—Motor Controllers pp. 1-48, Apr. 2006.*
TECO-Westinghouse TEAMmaster—Medium Voltage Solid State Starters pp. 1-8, Dec. 1998.*
Square D Motorpact—Medium Voltage Motor Controllers pp. 1-44, Dec. 2003.*

(Continued)

*Primary Examiner* — Paul Ip
(74) *Attorney, Agent, or Firm* — Banner & Witcoff, Ltd.

(57) ABSTRACT

A medium voltage variable frequency drive having a 2-high controller configuration with a dual bus system is described. The drive control system includes at least one motor control cabinet housing a fused medium voltage bypass controller, a non-fused transfer controller positioned above the fused medium voltage bypass controller, an extendable output bus coupled to the non-fused medium voltage transfer controller, and an extendable supply bus coupled to the fused medium voltage bypass controller. The drive control system further includes a variable frequency drive cabinet housing a variable frequency drive. The variable frequency drive is coupled to the extendable output bus and a power supply line. The power supply line may be further coupled to the extendable supply bus. The drive control system includes at least one cabling transition cabinet housing cabling between the at least one motor control cabinet, the power supply line, and the variable frequency drive.

17 Claims, 6 Drawing Sheets

OTHER PUBLICATIONS

GE (www.geeelectrical.com) Medium Voltage Equipment pp. 1-24, Jan. 2010.*

ANAB TEAMMaster Medium Voltage Solid State Starters pp. 1-12, Mar. 2010.*

Product Brochures and Schematics for Toshiba, JK Series, 400A & 720A Fixed Type Medium Voltage Motor Controllers, Toshiba International Corporation, Industrial Division, dated Mar. 1996 to Feb. 2005.

* cited by examiner

BYPASS AND SYNCHRONOUS TRANSFER ARRANGEMENT FOR A MEDIUM VOLTAGE DRIVE CONTROL SYSTEM

BACKGROUND

Medium voltage systems are often used to power heavy machinery, such as multiple high horsepower (e.g., 6000 hp) motors in a water pumping station. FIG. 1 illustrates an example system having two such motors 101a,b. Each motor 101a,b may be driven by electrical current supplied from a power supply line 102, and through corresponding fused medium voltage bypass controllers 103a,b. The bypass controllers 103a,b may include a switch, a fuse that may be rated to carry large amounts of current, such as 400 Amps, a contactor and a current sensor.

The individual bypass controllers 103a,b may connect the motors 101a,b to the supply line 102 to allow the motors 101a,b to be run "across the line," or directly using the currents and phases of the supply line 102. However, during a startup procedure, it may be desirable to control one of the motors at less than normal frequency and thus operate the motor at some reduced speed because of load (e.g. pump) requirements.

Accordingly, during startup, the bypass controllers 103a,b are taken out of the control lines for the motors 101a,b. Instead, variable frequency drive 104 may be connected, via a non-fused medium voltage transfer controller 105a, to the idle motor 101a. The variable frequency drive 104 may gradually vary the voltage and frequency supplied to the motor 101a through the non-fused transfer controller 105a, to gradually bring motor 101a up to speed.

Depending on load requirements, the individual motors 101a,b may be brought up to speed sequentially, so that a first motor 101a is brought up to speed before a second one 101b. In such a case, the transfer controllers 105a,b are also sequentially added to the control lines (e.g., controller 105a is used during startup of motor 101a, controller 105b is used during startup of motor 101b, etc.).

The commercially-available bypass controllers 103a,b that are rated for large levels of current (e.g., greater than 400 amps) are only offered for sale in single, standalone cabinets, as depicted in FIG. 1. The individual cabinets house just the components needed for the controller 103a,b, and do not offer additional space for additional controllers. As a result, significant amounts of floor space are required to support the various individual cabinets shown in FIG. 1. Even more space is occupied with the cabling, such as supply line 102, output bus 106, and lines 107a,b to the motors 101a,b.

SUMMARY

The following summary generally addresses many of the features described herein, but is not intended to limit the scope of this disclosure or identify features of greater importance to the claims herein. Although an improved arrangement for medium voltage drive control systems is used as an example herein, it should be noted that the systems and methods described are equally applicable to other drive control systems.

The systems and features described herein relate, for example, to providing an improved arrangement for large high powered medium voltage variable frequency drives having fused and non-fused controllers.

In some aspects, medium voltage drive controls systems are described. The medium voltage drive control systems may include at least one motor control cabinet housing a medium voltage fused bypass controller and a medium voltage non-fused transfer controller positioned above the fused bypass controller. The drive control system may also include a variable frequency drive cabinet housing a variable frequency drive. The system may include an extendable output bus coupled to the transfer controller and the variable frequency drive. The system may further include an extendable supply bus coupled to a power supply and the fused bypass controller. The transfer controller and the bypass controller may be coupled to a motor. A power supply line may be coupled to the extendable supply bus and the variable frequency drive.

In other aspects, methods for using medium voltage drive control systems are described. A first motor may be started and brought up to speed by a variable frequency drive housed in a variable frequency drive cabinet. The first motor may be synchronized and transferred from the variable frequency drive to the supply line by a first fused medium voltage bypass controller housed in a first motor control cabinet. The transfer of the first motor may be done by disconnecting it from the variable frequency drive using a non-fused medium voltage transfer controller housed in the first motor control cabinet above the first fused medium voltage bypass controller. A second motor may be started and brought up to speed by the variable frequency drive. The second motor may be synchronized and transferred from the variable frequency drive to the supply line by a second fused medium voltage bypass controller housed in a second motor control cabinet. The transfer of the second motor may be done by disconnecting from the variable frequency drive using a second non-fused transfer controller housed in the second motor control cabinet above the fused medium voltage bypass controller. In a reverse sequence, the second motor may be transferred from the second fused medium voltage bypass controller to the variable frequency drive and the variable frequency drive may then be used to control or stop the second motor. After the second motor is stopped, the first motor may be transferred from the first fused medium voltage bypass controller to the variable frequency drive and the variable frequency drive may be used to control or stop the first motor.

Additional features described herein will be addressed in greater detail below.

BRIEF DESCRIPTION OF THE DRAWINGS

FIG. 2b illustrates an alternative configuration for the medium voltage variable frequency drive control system of FIG. 2a.

DETAILED DESCRIPTION

Figure 1:
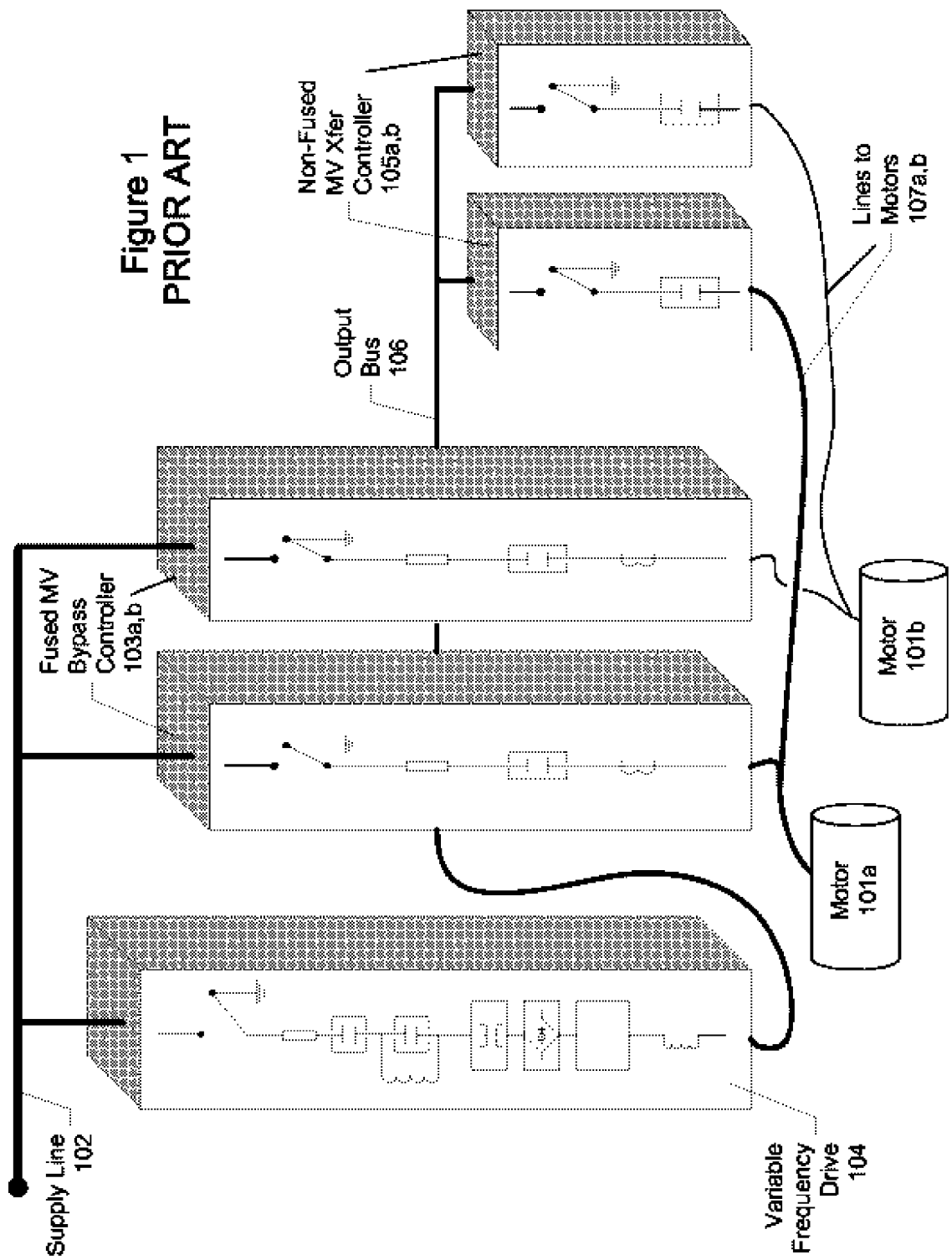
FIG. 1 illustrates a conventional 1-high configuration of a medium voltage variable frequency drive control system having a single bus system.

FIG. 2 illustrates an exemplary embodiment of a 2-high controller configuration for a medium voltage variable frequency drive control system 200. Medium voltage drive control systems 200 may be in the range of 2300 to 7200 Volts. The drive control system 200 may include a motor control cabinet 201a,b for each motor 101a,b being controlled. The motors 101a,b being controlled may be up to 6000 horsepower. The cabinet 201a,b may include portions stacked one above the other. A first portion 202 may include the bypass controller 103 components, and the second portion 203 may include the transfer controller 105 components. Stacking the components in this manner may help conserve floor space, and stacking the high-heat generating portion (the bypass controller 103 and its fuse) at the bottom helps reduce the risk of that portion receiving extraneous heat generated by other portions, such as the transfer portion 203.

The top-most portion of the cabinet may include an output bus portion 204. That portion 204 may include an extendable output bus 106 and wiring harnesses and trays to carry the output bus cabling from the transfer controller 105 to the variable frequency drive 104. In some embodiments, the output bus wiring from neighboring cabinets 201a,b may be routed across the tops of those cabinets in the output bus portions, and to a cabling transition cabinet, such as an end output bus cabinet 205. The end output bus cabinet 205 may be a vertical cabinet having an aperture (not shown) at the top to receive output bus wiring from the motor control cabinets 201a,b, and wiring harnesses and trays to carry the output bus wiring outside of the cabinet 205, where they may run over to the variable frequency drive 104's cabinet. FIG. 2 illustrates this output bus wiring as laying on the floor, but the output bus wiring may be routed in another wiring tray if desired between the output bus cabinet 205 and the variable frequency drive 104's cabinet.

The system 200 may also include a second cabling transition cabinet, in the form of a supply line cabinet 206, which may receive the supply line 102, and which may route that supply line to the neighboring motor control cabinets 201a,b. The supply line 102 may be routed into each of the bypass controller 202 portions of the motor control cabinets 201a,b, forming an extendable supply bus 107. If desired, the bypass portion 202 may further include a power supply line portion, which may have its own wiring harnesses and trays to carry the supply line 102 to the respective bypass controllers 103a, b. The system 200 may further include cabling connecting the variable frequency drive 104 to the supply line 102. The cabling connecting the variable frequency drive 104 to the supply line 102 may be external to the variable frequency drive 104 cabinet or internal to the cabinet.

Figure 2A:
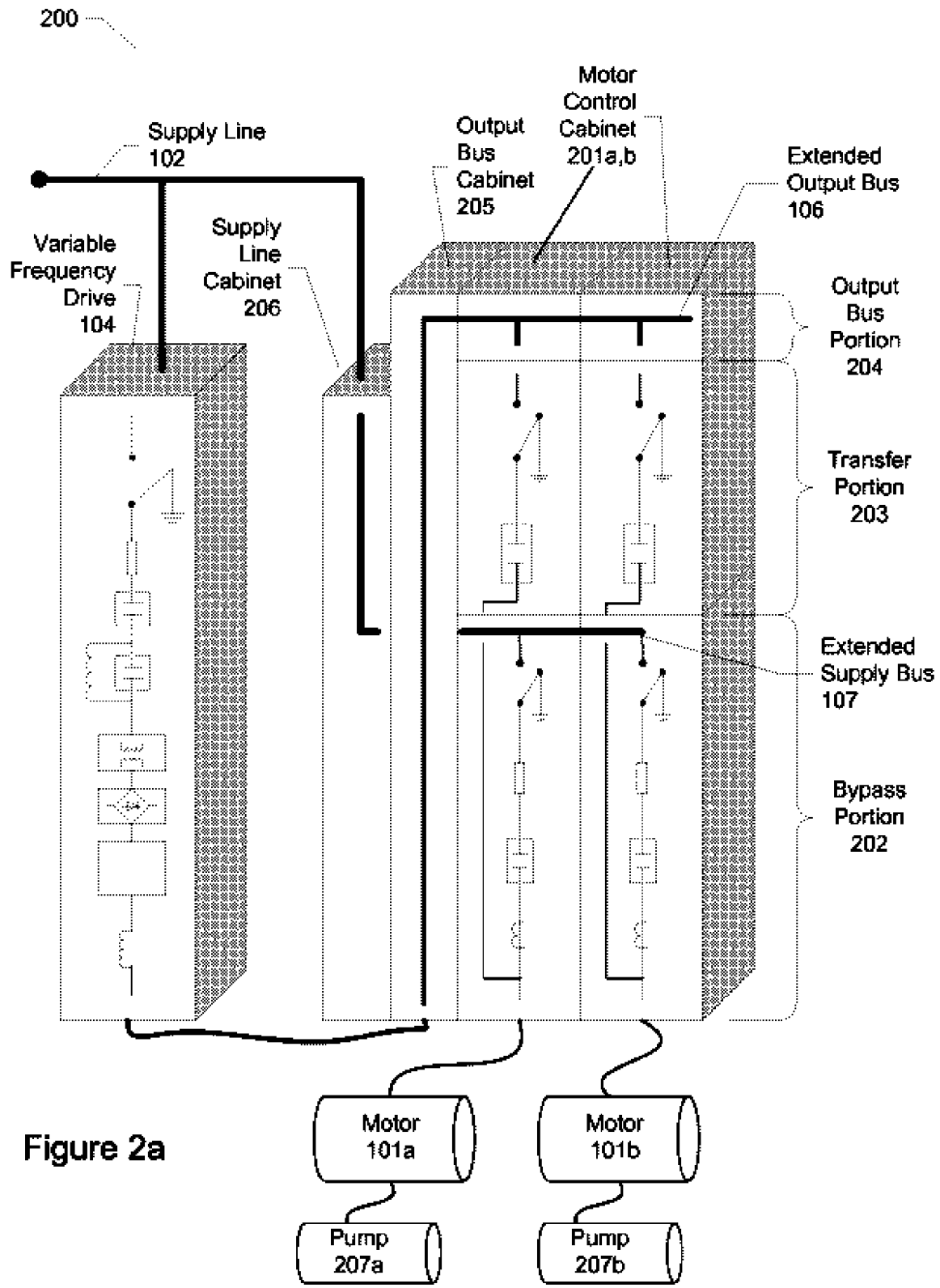
FIG. 2a illustrates a medium voltage variable frequency drive control system having a 2-high controller configuration with a dual bus system.
Figure 2B:
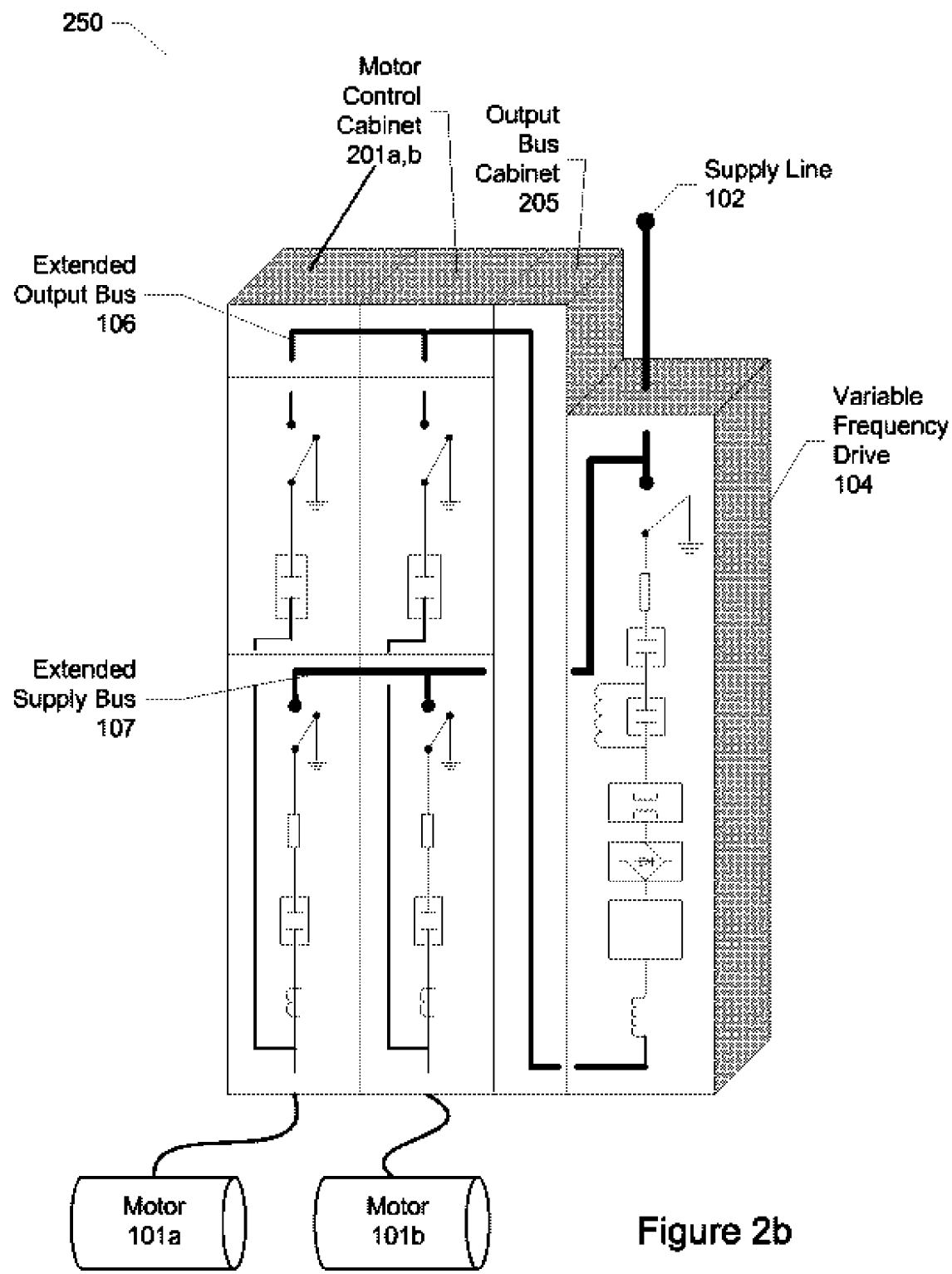

To further consolidate the components, a modified system 250 is shown in FIG. 2b having the variable frequency drive 104 cabinet attached to one end of the components shown in FIG. 2a (with output bus cabinet 205 moved to the right-hand side for ease of illustration, and omitting the supply line cabinet 206. Indeed, the motor control cabinets 201a,b, the cabling transition cabinets 205, 206, and the variable frequency drive cabinet may be arranged in any suitable manner. For example, all of the cabinets may be arranged side by side and abut each other. Alternatively, the cabinets may be spaced apart. The drive control system 200 may further include at least one cabling transition cabinet configured to house cabling between controllers. With the output bus 106 and supply line bus 107 being extendable, additional motor control cabinets 201 may be added to the system in a modular and compact manner.

Figure 3:
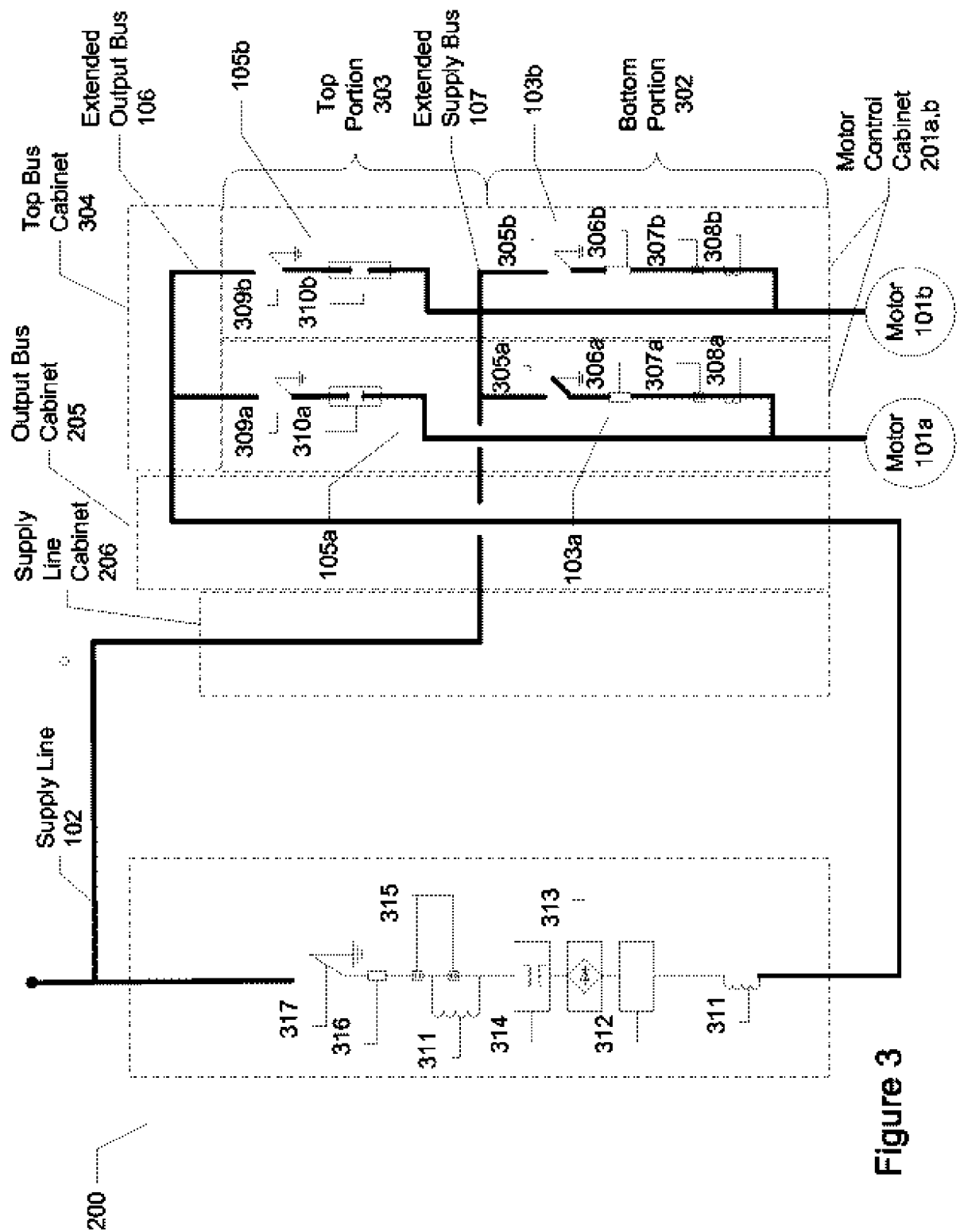
FIG. 3 illustrates the electrical components of the 2-high controller configuration of the medium voltage variable frequency drive control system of FIGS. 2a, 2b.

FIG. 3 illustrates the basic electrical components of the drive control system 200, with cabinet housings illustrated in dashed lines. As shown in FIG. 3, the motor control cabinets 201a,b may each include a top portion 303 that corresponds to the transfer portion 203 (e.g., FIG. 2a), and a bottom portion 302 that corresponds to the bypass portion 202 (e.g., FIG. 2a). A first fused bypass controller 103a may be housed within the bottom portion 302 and a first non-fused (e.g., omitting a fuse in the primary control line) transfer controller 105a within the top portion 303 of the first motor control cabinet 201a. The second motor control cabinet 201b may include a second fused bypass controller 103b housed within the bottom portion 302 and a second non-fused transfer controller 105b within the top portion 303. The extendable supply bus 107 may extend through the bottom portion 302 of the motor control cabinets 201a,b and provide power to each of the bypass controllers 103a,b.

In one embodiment, illustrated in FIGS. 2a,b, the extendable output bus 106 may extend through the top portion 302 of the motor control cabinets 201a,b and electrically couple each of the transfer controllers 105a,b to the variable frequency drive 104. The extendable output bus 106 may be housed within top bus cabinet 304 that is positioned above or on top of the motor control cabinets 201a,b. In this embodiment, the extendable supply bus 106 extends downward through the top of the motor control cabinets 201a,b to couple the transfer controllers 105a,b to the variable frequency drive 104. Alternatively, the top bus cabinet 304 may simply be an internal portion of the motor control cabinet 201a,b.

The bypass controllers 103a,b may include any necessary components for directing power from the supply line 102 to the motors 101a,b, while bypassing the variable frequency drive 104, to run the motors across the line. For example, each of the bypass controllers 103a,b may include a switch 305a,b, a fuse 306a,b, a contactor 307a,b, and a protection sensor (e.g., current sensor) 308a,b. The transfer controllers 105a,b may include any necessary components for transferring power to the motors 101a,b between the power supply line 102 and the variable frequency drive 104. For example, each of the transfer controllers 105a,b may include a switch 309a,b and a contactor 310a,b, but may omit a fuse rated for high currents (greater than 400 Amps). The components of the bypass controllers 103a,b and transfer controllers 105a,b may all be rated to carry large amounts of current, greater than 400 Amps, and voltages between 2300 and 7200 volts, which are used in medium voltage systems 200.

Due to the heat-sensitivity of a fused-controller and the heat generated by the fuses in the bypass controllers 103a,b, only one fused controller can be located within a single cabinet in the prior art system shown in FIG. 1. However, by placing a less heat-sensitive controller, e.g., a non-fused controller, within the same cabinet, the required cabinetry and floor space required for a drive control system 200 may be decreased. The non-fused transfer controllers may be positioned above the fused bypass controllers to reduce the number of required cabinets without subjecting the fused bypass controllers to additional heat.

The variable frequency drive 104 may include any necessary components to bring the motors 101a,b up to speed and stop the motors 101a,b. For example, as illustrated in FIG. 3, the variable frequency drive may include inductors 311, a transistor inverter 312, a rectifier 313, a transformer 314, contactors 315, fuses 316, and a switch 317. The variable frequency drive 104 may include additional components or alternative arrangements of components, other than the arrangement illustrated in FIG. 3, within the scope of the invention.

Figure 4:
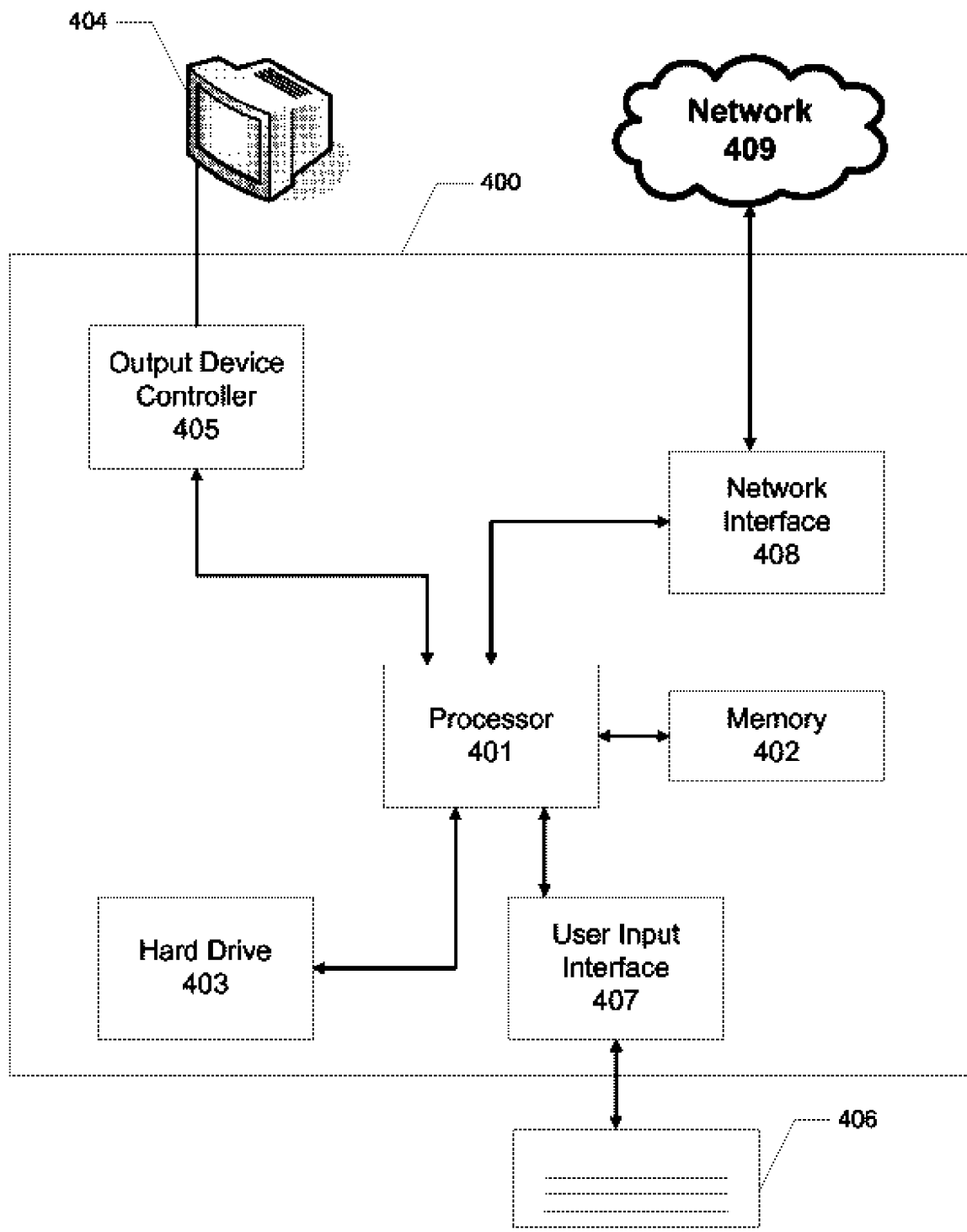
FIG. 4 illustrates a computer or server that may be used with the medium voltage drive control system.

The system 200 may further include software and/or hardware on a computing platform, such as a network server or computer, to control the operation of the various components of the system 200. For example, a controller computer may control the operation of the various contactors (307, 310) to couple and decouple the bypass and transfer controllers from the supply line and variable frequency drive 104. FIG. 4 illustrates the general hardware elements of such a server or computer 400. The server or computer 400 may include one or more processors 401, which may execute instructions of a computer program to perform any of the features described herein. Those instructions may be stored in any type of computer readable media or memory 402, to configure the operation of the processor 401. For example, instructions may be stored in a read-only memory (ROM), random access memory (RAM), removable media, such as a Universal Serial Bus (USB) drive, compact disk (CD) or digital versatile disk (DVD), floppy disk drive, or any other desired electronic storage medium. Instructions may also be stored in a hard drive 403. The server or computer 400 may include one or more output devices, such as a monitor 404, speakers, or printers. The output devices may be controlled by one or more output device controllers 405, such as a video processor. There may also be one or more user input devices, such as a keyboard 406, mouse, touch screen, microphone, etc., which may be connected to the processor 401 through a user interface 407. The server or computer 400 may also include one or more network interface 408, such as a modem or network card to communicate with network 409. The network interface 408 may be a wired interface, wireless interface, or a combination of the two.

Figure 5:
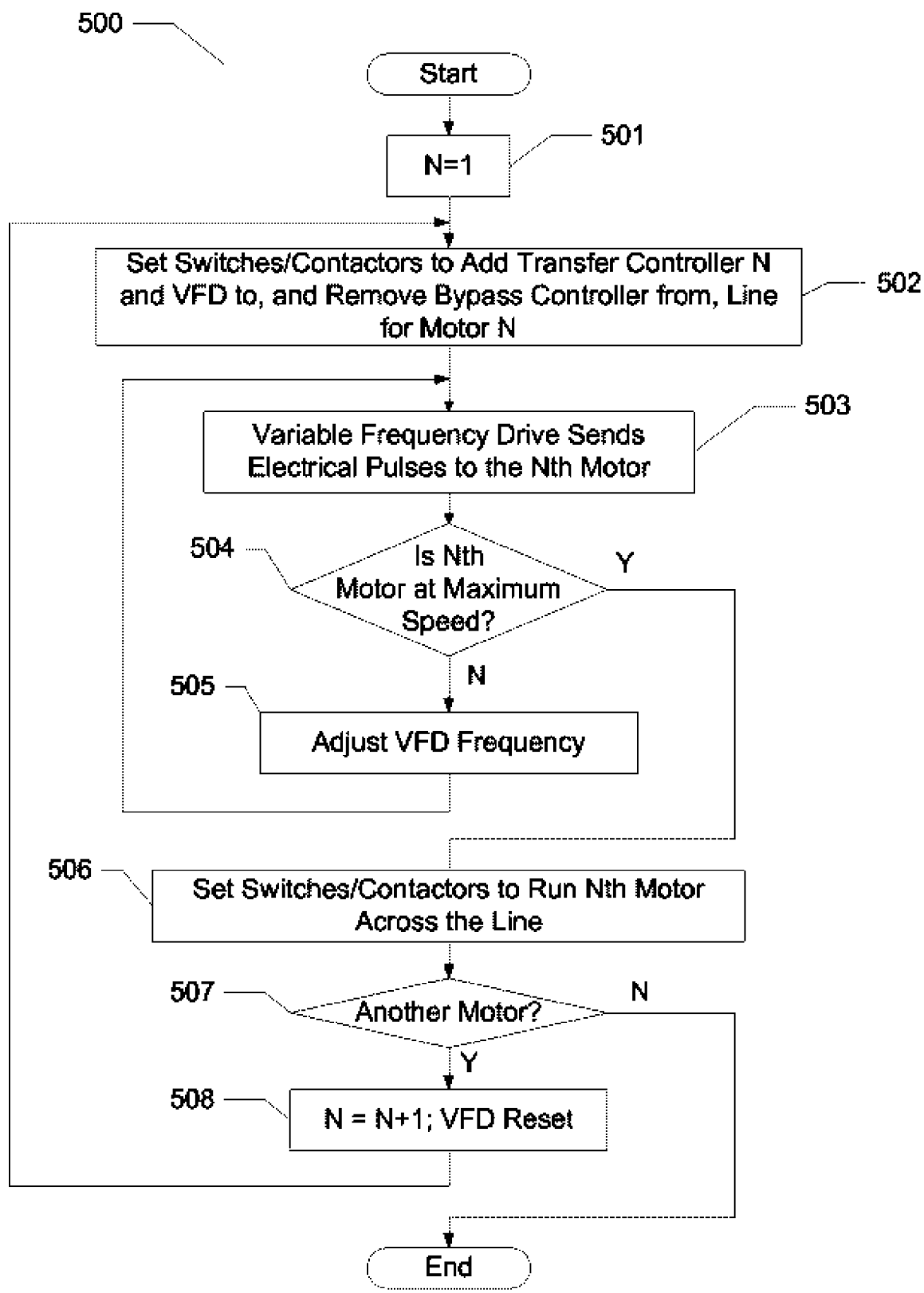
FIG. 5 illustrates a method of using a 2-high controller configuration of the medium voltage variable frequency drive control system of FIGS. 2-3.

In operation, system 200 may be used to power different types of machinery, such as pumping systems. To power a pumping system, each motor 101*a,b* may power a separate pump 207*a,b*, respectively, as shown in FIG. 2*a*. FIG. 5 illustrates a method 500 of using the drive control system 200 to start and operate the motors 101*a,b* for pumps 207*a,b*. Although the illustrated examples only show two motors 101*a,b* and pumps 207*a,b*, any desired number of motors and pumps may be used. As shown, system 200 includes one motor 101*a,b* for each motor control cabinet 201*a,b*. Alternatively, additional motors may be connected in parallel with one of the motors 101*a,b*, such that the motors are controlled by one motor control cabinet 201*a,b* and operate as a single motor.

In step 501, value n may be set to 1 (n will be used to step through the various motors in the system). In step 502, the non-fused transfer controller corresponding to the nth motor may be added to the control line circuit, while the corresponding bypass controller may be removed from the circuit. Using the FIG. 3 example, and for starting the first motor 101*a*, switch 309*a* may be closed (to add the transfer controller 105*a* to the circuit for motor 101*a*, while switch 305*a* may be opened to remove the bypass controller 103*a* from the circuit for motor 101*a*. In that switch configuration, variable frequency drive 104 is connected to the motor 101*a* through the transfer controller 105*a*.

Then, in step 503, variable frequency drive 104 may begin to apply electrical pulses to the motor being started. Those pulses may be set at an initial frequency. In step 504, the system may determine whether the motor has reached a predetermined operating speed. This determination may be made using any desired measuring technique (e.g., monitoring the rotational speed of a motor rotor), and using any desired value (e.g., stored in system memory) as the predetermined operating speed. If, in step 504, the motor has not reached the predetermined operating speed, then the system may proceed to step 505, in which the variable frequency drive 104 may increase or decrease the frequency of its pulses, and the process may return to step 503 to apply the modified frequency pulses to the motor. This loop may continue as long as desired or until the motor reaches maximum operating speed. In this manner, the speed of the motor may be regulated.

If the motor has reached its maximum operating speed, the system may then set the switches 506 (or contactors—in some embodiments, the switches are manually operated and used for safety purposes, to the "switching" herein may be performed using computer-controlled contactors) to run the motor across the line. In the FIG. 3 example, for the first motor 101*a*, this may involve opening contactor 310*a* in transfer controller 105*a* to remove the variable frequency drive 104 from the motor 101*a*'s line, and to close contactor 307*a* to connect bypass controller 103*a* to motor 101*a*'s line (thereby "bypassing" the variable frequency drive 104 in the motor's control line). In that configuration, motor 101*a* is connected to the bypass controller 103*a*, which in turn is directly connected to the supply line 102, and the current from the supply line 102 may be used to directly run motor 101*a*. This transfer of control may include synchronizing the frequencies of the variable frequency drive 104 with that on the supply line 102.

When the Nth motor is running across the line, the system may then proceed to step 507 to determine if another motor should be started. The determination to start another motor may be based on a level of need (e.g., if the water pumping facility decides that another motor is needed), or a user command entered into the system (e.g., via a computer as shown in FIG. 4). To start the next motor, the system may proceed to step 508, increasing N (to signify the next motor), and resetting the variable frequency drive 104 to the initial motor start frequency. The system may then return to step 502, and the variable frequency drive 104 may once again begin to apply current to start the next motor 101*b*. If, in step 507, no more motors are needed, then the process may simply conclude. Alternatively, the process may simply await in step 507 until another motor is needed.

The discussion above illustrates starting up motors, but a similar process may be used when it is necessary to stop or adjust the speed of a running motor. There, the transfer controller for the corresponding motor may be connected to the motor, with the variable frequency drive 104 synchronized to the current operating speed of the motor, and the motor's bypass controller may be removed from the circuit (by setting the switches as needed, such as in step 502). Then, the variable frequency drive 104 may apply gradually different (e.g., stepping down or up) frequency pulses to adjust the motor speed as needed. The transfer may occur by opening contactor 307*b* in the second bypass controller 103*b* and closing contactor 310*b* in the second transfer controller 105*a*. The variable frequency drive 104 may then adjust the speed of the second motor 101*b*, by adjusting the electrical pulses sent to the second motor 101*b*, until the second motor 101*b* stops (or reaches the desired new speed).

In the system 200, operation is facilitated by processor 401 or an equivalent automated device sending signals to actuators that are configured to open and close the contactors. While only two motors are shown in FIG. 3, any number of motors may be started and transferred to run off of the supply line 102.

Aspects herein have been described in terms of illustrative embodiments thereof. Further modifications and/or additions may be made as well within the scope and spirit of the appended claims, and will occur to persons of ordinary skill in the art from a review of this disclosure. For example, one of ordinary skill in the art will appreciate that the steps illustrated in the illustrative figures may be performed in other than the recited order, may be repeated, and that one or more steps illustrated may be optional in accordance with aspects of the disclosure. Accordingly, the scope of the present patent should only be defined by the following claims.

We claim the following:

1. A drive control system comprising:
   a variable frequency drive cabinet housing a variable frequency drive;
   a power supply line; and
   at least one motor control cabinet having a top portion and a bottom portion, wherein the at least one motor control cabinet houses
   a fused bypass controller, having a current rating greater than 400 amps, in the bottom portion;
   a non-fused transfer controller, having a current rating greater than 400 amps, in the top portion;
   wherein the variable frequency drive is coupled to the power supply line and the non-fused transfer controller and the fused bypass controller is coupled to the power supply line.

2. The system of claim 1, further comprising:
   at least one motor, wherein the at least one motor is coupled to the fused bypass controller and the non-fused transfer controller.

3. The system of claim 1, further comprising:
   an extendable supply bus in the bottom portion that couples the fused bypass controller to the power supply line; and
   an extendable output bus in the top portion that couples the non-fused transfer controller to the variable frequency drive.

4. The system of claim 1, wherein the fused bypass controller includes a switch, a fuse, a contactor, and a protection sensor, and the non-fused transfer controller includes a switch, a contactor, and a protection sensor.

5. The system of claim 4, further including a processor storing instructions on a computer readable medium, wherein executing the instructions causes a contactor in the non-fused transfer controller to open and a contactor in the fused bypass controller to close, transferring control of the motor from the variable frequency drive to the power supply line.

6. The system of claim 3, further comprising:
   at least one cabling transition cabinet housing a portion of the cabling between the power supply line and the extended supply bus and housing a portion of cabling between the extended output bus and the variable frequency drive.

7. The system of claim 1, wherein the fused bypass controller and the non-fused transfer controller are rated for voltages between 2300 and 7200 volts.

8. A medium voltage cabinet comprising:
   a medium voltage fused bypass controller in a bottom portion of the cabinet;
   a medium voltage non-fused transfer controller above the fused bypass controller; and
   and an output bus above the non-fused transfer controller, connecting the non-fused transfer controller to a variable frequency drive,
   wherein the fused bypass controller and the non-fused transfer controller are rated for voltages between 2300 and 7200 volts and with a current rating greater than 400 amps.

9. The medium voltage cabinet of claim 8, wherein the cabinet is configured to house an extendable supply bus that is electrically coupled to the fused bypass controller.

10. The medium voltage cabinet of claim 8, wherein the cabinet is configured to house an extendable output bus that is electrically coupled to the non-fused transfer controller.

11. A drive control system comprising:
    a first motor control cabinet housing a first fused medium voltage bypass controller and a first non-fused medium voltage transfer controller above the first fused medium voltage bypass controller;
    a second motor control cabinet housing a second fused medium voltage bypass controller and a second non-fused medium voltage transfer controller above the second fused medium voltage bypass controller;
    an extendable supply bus coupled to both of the bypass controllers and a power supply line;
    an extendable output bus coupled to both of the transfer controllers; and
    a variable frequency drive cabinet housing a variable frequency drive, the variable frequency drive coupled to the extendable output bus and the power supply line, wherein the bypass and transfer controllers have current ratings greater than 400 amps.

12. The system of claim 11, further comprising:
    a first and second motor, wherein the first fused bypass controller and the first non-fused transfer controller are coupled to the first motor and the second fused bypass controller and the second non-fused transfer controller are coupled to the second motor.

13. The system of claim 12, wherein the variable frequency drive is configured to regulate the speed of the first motor and second motor.

14. The system of claim 12, wherein the variable frequency driver controller is configured to start and stop the first motor and the second motor.

15. The system of claim 11, further comprising:
    at least one cabling transition cabinet housing a portion of the cabling between the power supply line and the extendable supply bus and housing a portion of cabling between the extended output bus and the variable frequency drive.

16. The system of claim 11, wherein the bypass controller includes a switch, a fuse, a contactor, and a protection sensor, and the transfer controller includes a switch, a contactor, and a protection sensor.

17. The system of claim 11, wherein the extendable output bus is housed within top cabinet positioned above the first motor control housing and the second motor control housing, a portion of the extendable supply bus is housed within the first motor control housing, and a portion of the extendable supply bus is housed within the second motor control housing.

* * * * *